US011428161B2

(12) United States Patent
O'Flarity et al.

(10) Patent No.: US 11,428,161 B2
(45) Date of Patent: Aug. 30, 2022

(54) GAS TURBINE ENGINE AND METHOD FOR OPERATING SAME

(71) Applicant: Raytheon Technologies Corporation, Farmington, CT (US)

(72) Inventors: Steven M. O'Flarity, Port Saint Lucie, FL (US); Neil Terwilliger, Meriden, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/142,726

(22) Filed: Jan. 6, 2021

(65) Prior Publication Data
US 2021/0231051 A1    Jul. 29, 2021

Related U.S. Application Data

(63) Continuation of application No. 16/549,759, filed on Aug. 23, 2019, now Pat. No. 10,914,234.

(51) Int. Cl.
*F02C 6/14* (2006.01)
*H02K 7/116* (2006.01)
*H02K 7/18* (2006.01)
*H02K 11/00* (2016.01)

(52) U.S. Cl.
CPC ............ *F02C 6/14* (2013.01); *H02K 7/116* (2013.01); *H02K 7/1823* (2013.01); *H02K 11/0094* (2013.01)

(58) Field of Classification Search
CPC ......... F02C 6/14; H02K 7/116; H02K 7/1823; H02K 11/0094
See application file for complete search history.

(56) References Cited

U.S. PATENT DOCUMENTS

| | | | |
|---|---|---|---|
| 5,114,103 A * | 5/1992 | Coffinberry | F02C 7/14 244/209 |
| 5,899,085 A | 5/1999 | Williams | |
| 7,040,082 B2 | 5/2006 | Bouiller | |
| 7,059,136 B2 | 6/2006 | Coffinberry | |
| 7,246,482 B2 | 7/2007 | Mahoney | |
| 8,291,715 B2 | 10/2012 | Libera | |
| 8,844,296 B2 | 9/2014 | Barkowsky | |
| 9,175,605 B2 | 11/2015 | Bowman | |
| 10,309,303 B2 | 6/2019 | Bayles | |
| 2006/0260323 A1 | 11/2006 | Moulebhar | |
| 2007/0151258 A1 | 7/2007 | Gaines | |
| 2009/0288421 A1 | 11/2009 | Zeiner | |
| 2010/0314877 A1 | 12/2010 | Finney | |
| 2012/0221157 A1 | 8/2012 | Finney | |
| 2016/0032841 A1 | 2/2016 | Ronan | |
| 2017/0051679 A1 | 2/2017 | Becker, Jr. | |
| 2017/0106985 A1 | 4/2017 | Stieger | |

(Continued)

*Primary Examiner* — Viet P Nguyen
(74) *Attorney, Agent, or Firm* — Getz Balich LLC

(57) ABSTRACT

A gas turbine engine includes a compressor. A turbine is mechanically connected to the compressor by a shaft. An air-driven auxiliary turbine is in fluid communication with the compressor and is configured to receive pressurized air from the compressor. An auxiliary generator is operably connected to the auxiliary turbine. The auxiliary generator is configured to generate electrical energy in response to an operation of the auxiliary turbine. An energy storage device is in electrical communication with the auxiliary generator.

9 Claims, 6 Drawing Sheets

(56) References Cited

U.S. PATENT DOCUMENTS

| | | |
|---|---|---|
| 2017/0327235 A1* | 11/2017 | Feulner ..................... F02C 6/08 |
| 2018/0009536 A1* | 1/2018 | Christopherson ......... F02C 3/04 |
| 2018/0266329 A1 | 9/2018 | Mackin |
| 2019/0353103 A1 | 11/2019 | Roberge |
| 2020/0032702 A1 | 1/2020 | Kupratis |
| 2020/0056497 A1 | 2/2020 | Terwilliger |

* cited by examiner

GAS TURBINE ENGINE AND METHOD FOR OPERATING SAME

This application claims priority to U.S. patent application Ser. No. 16/549,759 filed Aug. 23, 2019, which is hereby incorporated herein by reference in its entirety.

BACKGROUND

1. Technical Field

This disclosure relates generally to gas turbine engines, and more particularly to systems for recovering energy from gas turbine engine compressor operability bleeds.

2. Background Information

Typical gas turbine engines may include a number of bleed air flow paths in fluid communication with the compressor section of the engine. At least a portion of a pressurized air flow through the compressor section may be released from the compressor section as bleed air to various systems (e.g., anti-ice systems) or atmosphere. Releasing the pressurized air as bleed air may assist in controlling certain parameters of the gas turbine engine by, for example, reducing an overall pressure ratio of the compressor section. Reducing the overall pressure ratio may, in turn, increase a stall margin of the gas turbine engine. However, releasing the pressurized air from the compressor section can result in a substantial reduction in gas turbine engine efficiency.

SUMMARY

According to an embodiment of the present disclosure, a method for operating a gas turbine engine is disclosed. Pressurized air is directed to an air-driven auxiliary turbine. Electrical energy is generated with an auxiliary generator in operable communication with the auxiliary turbine. The electrical energy is stored in an energy storage device.

In the alternative or additionally thereto, in the foregoing embodiment, the method further includes applying the electrical energy stored in the energy storage device to an electrical load.

In the alternative or additionally thereto, in the foregoing embodiment, the step of storing the electrical energy in the energy storage device is performed during a first engine loading condition and the step of applying the electrical energy stored in the energy storage device to the electrical load is performed at a second engine loading condition different than the first engine loading condition.

In the alternative or additionally thereto, in the foregoing embodiment, the auxiliary turbine is in rotational communication with a rotatable shaft operably connected between a compressor and a turbine.

In the alternative or additionally thereto, in the foregoing embodiment, the step of applying the electrical energy stored in the energy storage device to the electrical load includes applying the electrical energy to the auxiliary generator causing the auxiliary generator to apply a rotational force to the shaft.

In the alternative or additionally thereto, in the foregoing embodiment, the method further includes controlling, with a modulation device, a flow rate of the pressurized air directed to the auxiliary turbine.

In the alternative or additionally thereto, in the foregoing embodiment, the method further includes establishing, with the modulation device, a first flow rate of the pressurized air at the first engine loading condition and a second flow rate of the pressurized air, different than the first flow rate of the pressurized air, at the second engine loading condition.

In the alternative or additionally thereto, in the foregoing embodiment, the first engine loading condition is an idle engine loading condition.

In the alternative or additionally thereto, in the foregoing embodiment, the idle engine loading condition is based on a minimum fuel flow limit.

In the alternative or additionally thereto, in the foregoing embodiment, the first flow rate is greater than the second flow rate.

In the alternative or additionally thereto, in the foregoing embodiment, the energy storage device is a battery.

According to another embodiment of the present disclosure, a gas turbine engine includes a compressor. A turbine is mechanically connected to the compressor by a shaft. An air-driven auxiliary turbine is in fluid communication with the compressor and is configured to receive pressurized air from the compressor. An auxiliary generator is operably connected to the auxiliary turbine. The auxiliary generator is configured to generate electrical energy in response to an operation of the auxiliary turbine. An energy storage device is in electrical communication with the auxiliary generator.

In the alternative or additionally thereto, in the foregoing embodiment, the auxiliary turbine is in rotational communication with the shaft.

In the alternative or additionally thereto, in the foregoing embodiment, the gas turbine engine further includes a modulation device in fluid communication with the compressor and the auxiliary turbine. The modulation device is configured to control a flow rate of the pressurized air directed to the auxiliary turbine.

In the alternative or additionally thereto, in the foregoing embodiment, the gas turbine engine further includes a controller in communication with the modulation device.

In the alternative or additionally thereto, in the foregoing embodiment, the controller is configured to control the modulation device such that the modulation device establishes a first flow rate of the pressurized air at a first engine loading condition and a second flow rate of the pressurized air, different than the first flow rate of the pressurized air, at a second engine loading condition different than the first engine loading condition.

In the alternative or additionally thereto, in the foregoing embodiment, the energy storage device is a battery.

In the alternative or additionally thereto, in the foregoing embodiment, the gas turbine engine further includes a gearbox assembly operably connected between the auxiliary turbine and the shaft.

In the alternative or additionally thereto, in the foregoing embodiment, the auxiliary turbine is configured to receive the pressurized air from a pressurized air source outside the gas turbine engine.

According to another embodiment of the present disclosure a gas turbine engine includes a first shaft interconnecting a fan, a low-pressure compressor, and a low-pressure turbine. A second shaft interconnects a high-pressure compressor and a high-pressure turbine. The high-pressure compressor is configured to receive a compressed air output of the low-pressure compressor. A main generator is operably connected to the second shaft. An air-driven auxiliary turbine is operably connected to the second shaft. The auxiliary turbine is in fluid communication with the high-pressure compressor and configured to receive pressurized air from the high-pressure compressor. An auxiliary generator is operably connected to the auxiliary turbine. The auxiliary generator is configured to generate electrical energy in response to an operation of the auxiliary turbine. An energy storage device is in electrical communication with the main generator and the auxiliary generator.

The present disclosure, and all its aspects, embodiments and advantages associated therewith will become more readily apparent in view of the detailed description provided below, including the accompanying drawings.

DETAILED DESCRIPTION

Figure 1:
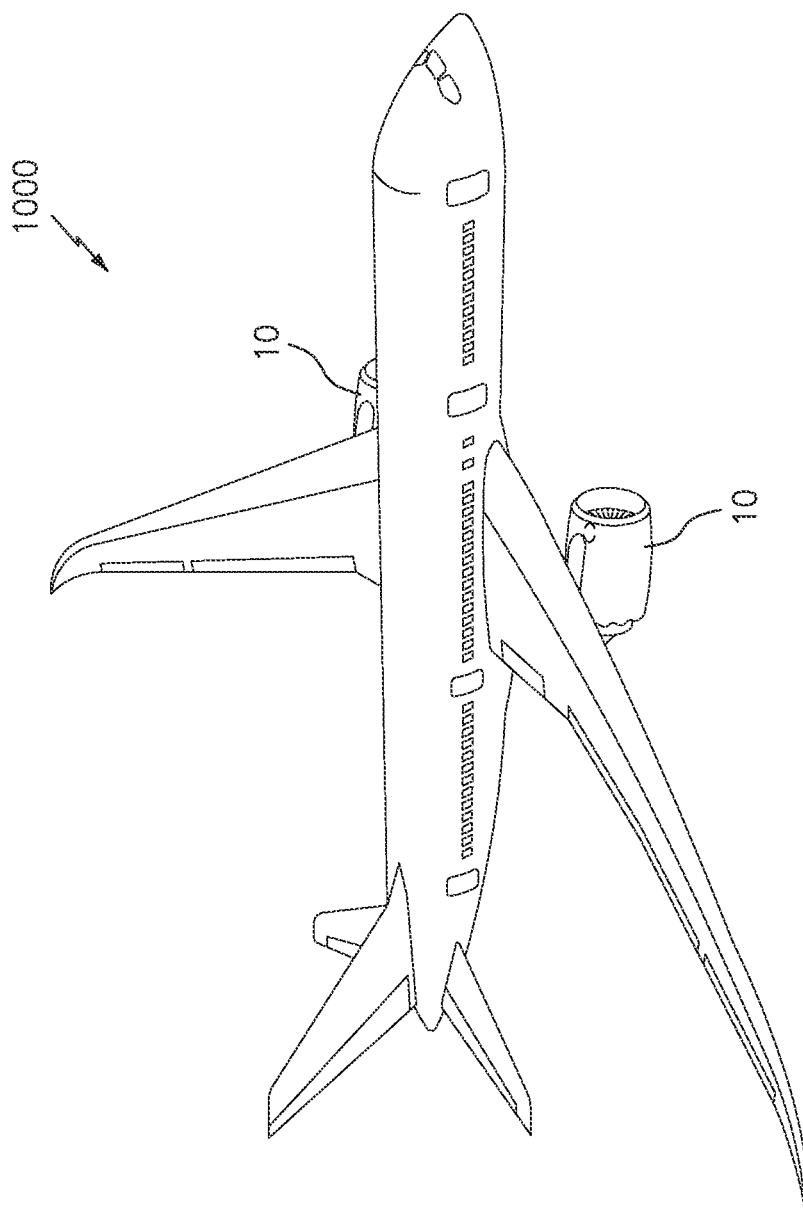
FIG. 1 illustrates a perspective view of an aircraft in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 2:
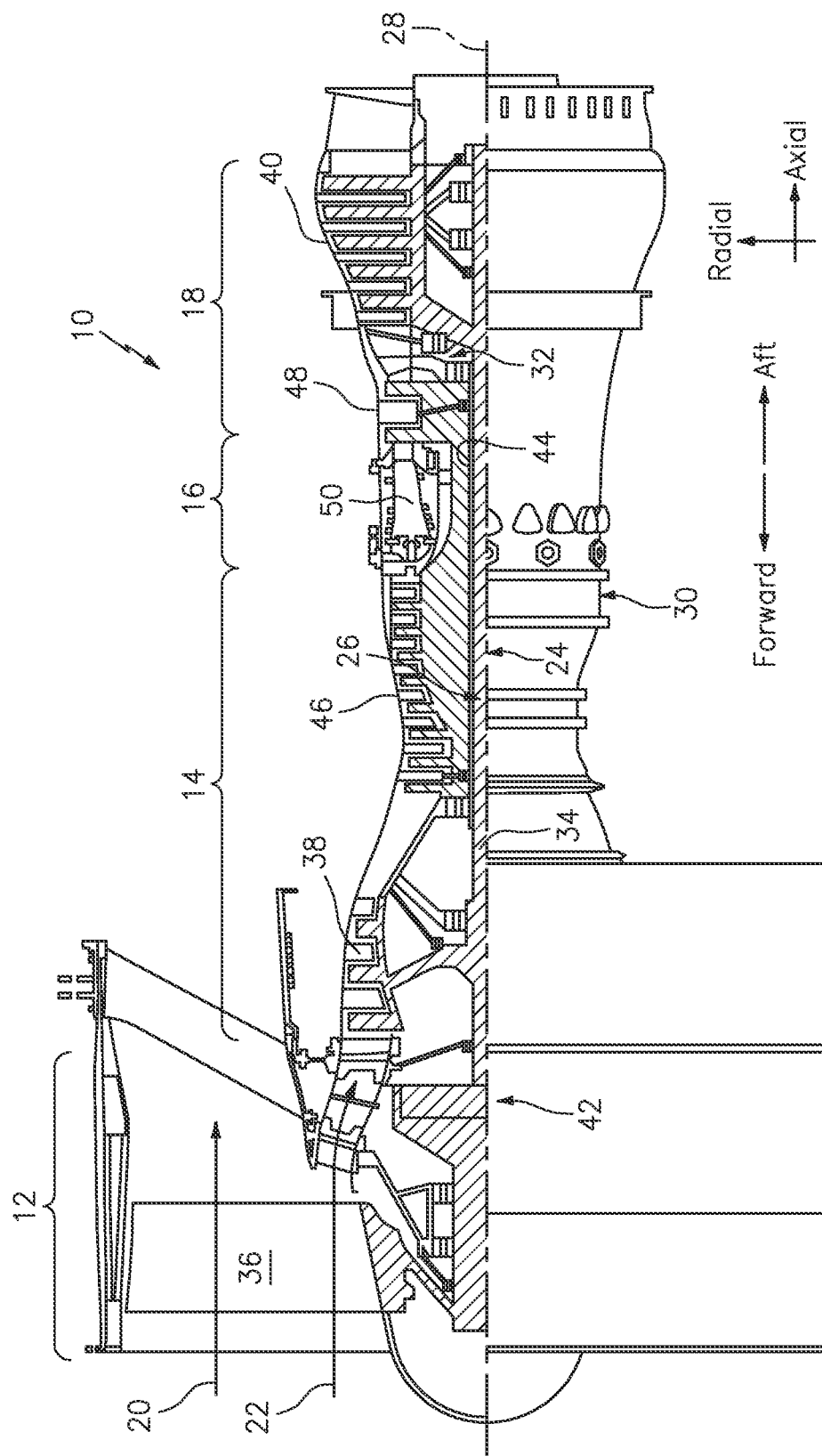
FIG. 2 illustrates a side cross-sectional view of a gas turbine engine in accordance with one or more embodiments of the present disclosure.

Referring to FIGS. 1 and 2, an aircraft 1000 including at least one gas turbine engine 10 is illustrated. The gas turbine engine 10 is disclosed herein as a two-spool turbofan engine that generally includes a fan section 12, a compressor section 14, a combustor section 16, and a turbine section 18. The fan section 12 drives air along a bypass flowpath 20 while the compressor section 14 drives air along a core flowpath 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those having various spool architectures such as one- or three-spool architectures. Furthermore, aspects of the present disclosure may be applicable to conventional and hybrid gas turbine engines.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44.

Airflow along the core flowpath 22 is compressed by the first compressor 38, then the second compressor 46, mixed and burned with fuel in the combustor 50, and then expanded over the second turbine 48 and the first turbine 40. The low-pressure turbine 40 and the high-pressure turbine 48 rotationally drive the low-pressure spool 24 and the high-pressure spool 26, respectively in response to the expansion.

Figure 3:
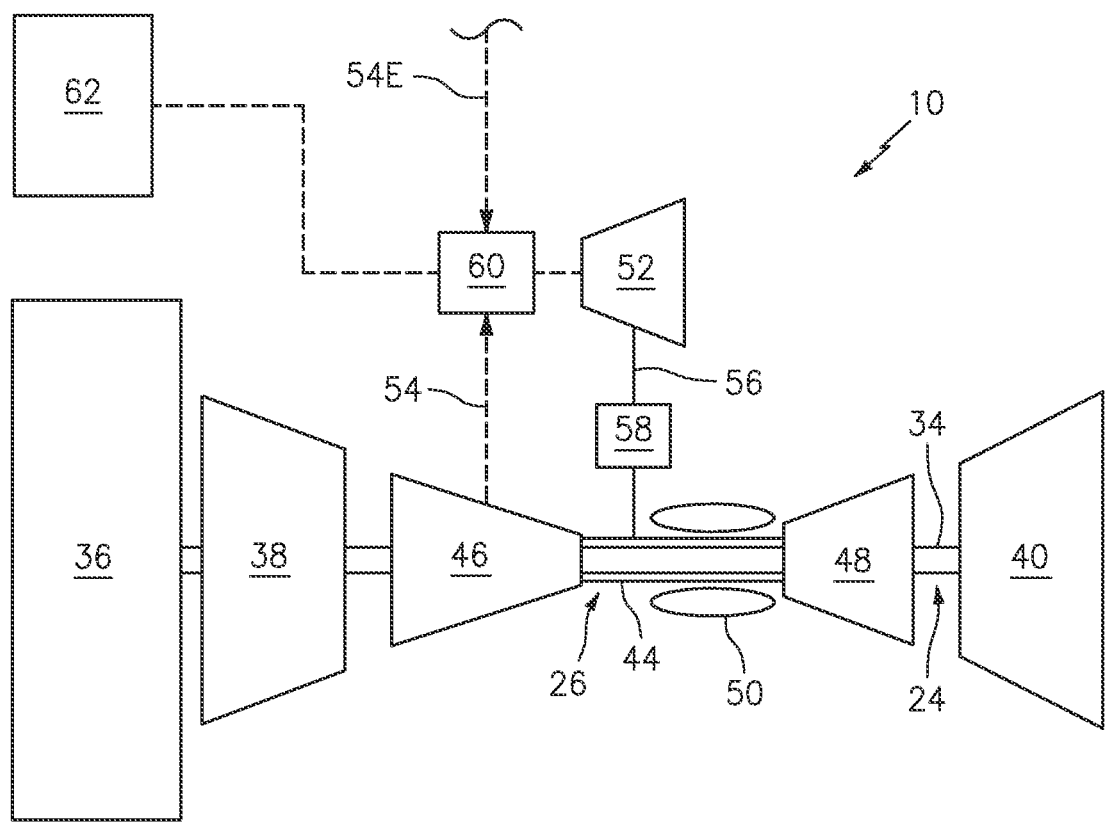
FIG. 3 schematically illustrates an exemplary gas turbine engine in accordance with one or more embodiments of the present disclosure.
Figure 4:
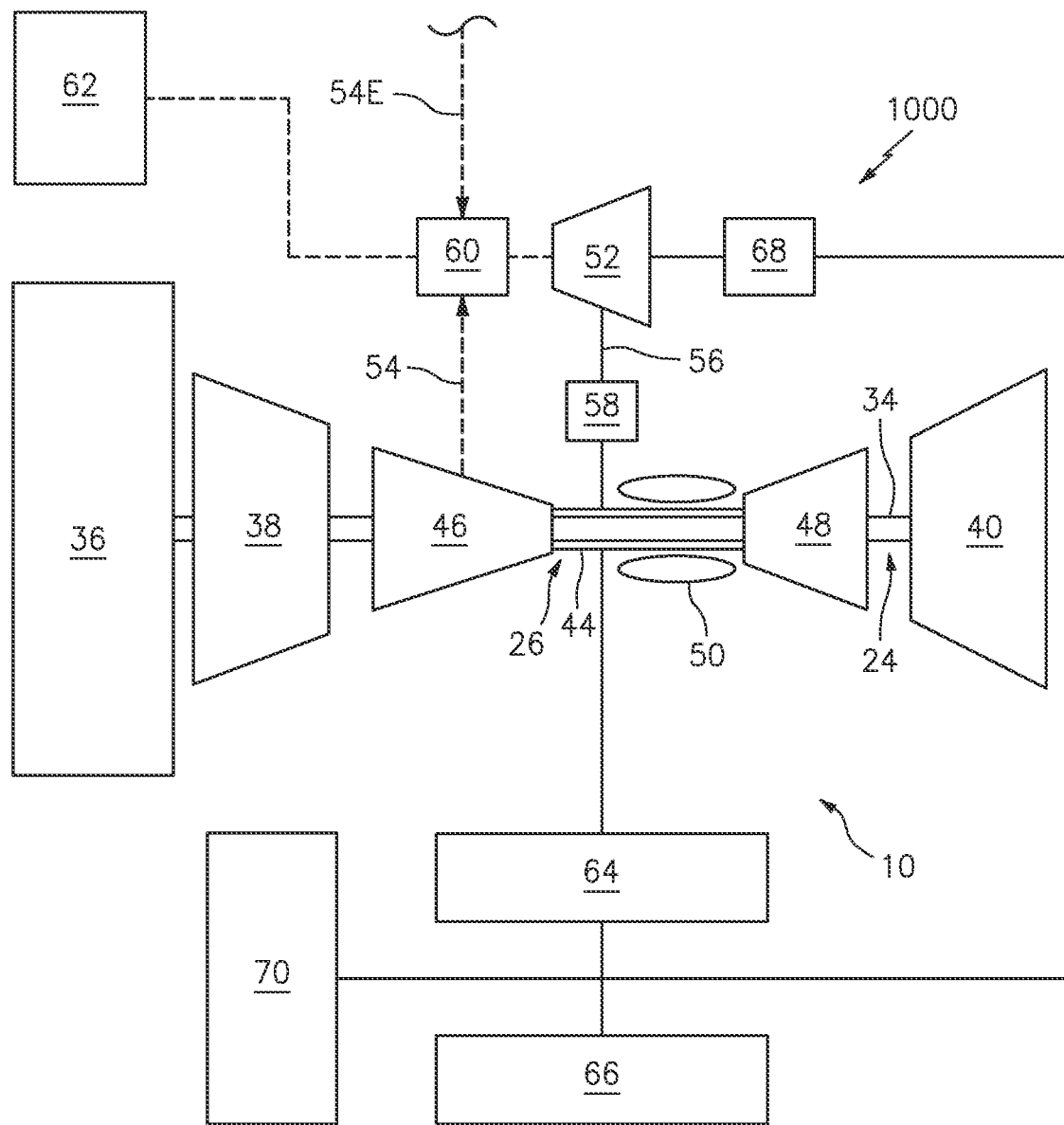
FIG. 4 schematically illustrates an exemplary gas turbine engine in accordance with one or more embodiments of the present disclosure.
Figure 5:
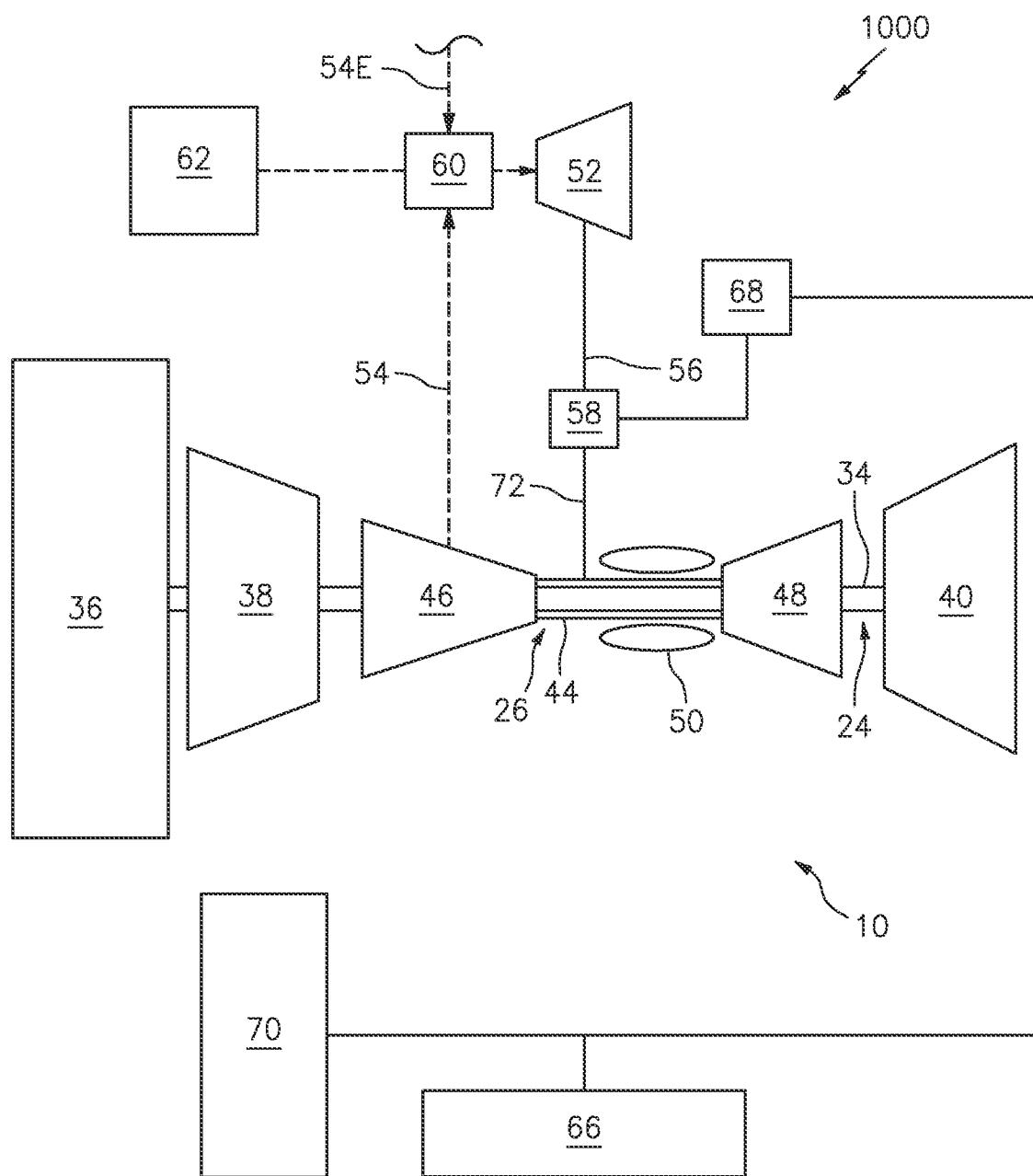
FIG. 5 schematically illustrates an exemplary gas turbine engine in accordance with one or more embodiments of the present disclosure.

Referring to FIGS. 3-5, pressurized air 54 may be drawn from one or both of the low-pressure compressor 38 and the high-pressure compressor 46 as part of an operability bleed (e.g., selectively bleeding pressurized air 54 from the compressors 38, 46). Solutions such as operability bleeds may reduce minimum thrust requirements of the gas turbine engine 10, for example, during idle engine conditions. Operability bleeds may further enable effective operation of a gas turbine engine, such as the gas turbine engine 10, experiencing substantial deterioration of compressor surge margin. Performance of operability bleeds without subsequently using the pressurized air 54 may waste substantial amounts of energy as the energy of the pressurized air 54 may be lost.

The gas turbine engine 10 includes an auxiliary turbine 52. The auxiliary turbine 52 may be an air-driven turbine (e.g., a pneumatic turbine). Accordingly, the auxiliary turbine 52 may be configured to receive the pressurized air 54 (e.g., a compressor bleed air), for example, from one or more of the high-pressure compressor 46, the low-pressure compressor 38, a source of pressurized air 54E external to the aircraft 1000, or any other suitable source of pressurized air. As shown in FIG. 3, the auxiliary turbine 52 is in fluid communication with the high-pressure compressor 46 via, for example, piping or any other suitable fluid conduit. The auxiliary turbine 52 is configured to extract mechanical energy from the pressurized air 54, 54E. For example, the auxiliary turbine 52 may include a turbine rotor configured to rotate as the pressurized air 54 passes through the auxiliary turbine 52. In various embodiments, the auxiliary turbine 52 may be an air turbine starter for the gas turbine engine 10. In various other embodiments, the auxiliary turbine 52 may be independent of an air turbine starter for the gas turbine engine 10.

The auxiliary turbine 52 may include an auxiliary shaft 56 operably connected to the second shaft 44. Accordingly, the auxiliary turbine 52 may be configured to apply a rotational force to the second shaft 44 so as to transfer the mechanical energy extracted from the pressurized air 54 to the high-pressure spool 26. In various embodiments, a gearbox system 58 may be disposed between the auxiliary shaft 56 and the second shaft 44 to provide speed control between the auxiliary shaft 56 and the second shaft 44. In various embodiments, the gearbox system 58 may include a clutch to selectively engage the auxiliary shaft 56 with the second shaft 44. Extracting mechanical energy from the pressurized air 54 and returning that mechanical energy to the high-pressure spool 26 via the auxiliary turbine 52 may have the effect of lowering gas turbine engine 10 fuel flow at idle, lowering exhaust gas temperatures, and/or improving acceleration response of the gas turbine engine 10 due to an increased high-pressure compressor 46 surge margin at idle and a higher idle rotation speed (i.e., "N2") of the high-pressure spool 26.

In various embodiments, the gas turbine engine 10 may include a modulation device 60 configured to control the flow of pressurized air 54, 54E to the auxiliary turbine 52. The modulation device 60 may include, for example, one or more flow control valves and/or flow sensors suitable for measuring and controlling the flow of pressurized air 54, 54E supplied to the auxiliary turbine 52. During operation of the aircraft 1000, different flow rates of the pressurized air 54, 54E supplied to the auxiliary turbine 52 may be desirable based on, for example, different engine loading conditions of the gas turbine engine 10. For example, a first flow rate of pressurized air 54, 54E supplied to the auxiliary turbine 52 at a first engine loading condition may be different than a second flow rate of pressurized air 54, 54E supplied to the auxiliary turbine 52 at a second engine loading condition. Different engine loading conditions may include, but are not limited to, idle engine conditions, engine warm-up, acceleration, deceleration, aircraft 1000 take-off, cruising, and landing, etc. In various embodiments, the modulation device 60 may be configured to increase the flow rate of pressurized air 54 (e.g., compressor bleed air) supplied to the auxiliary turbine 52 during an acceleration or deceleration engine condition in order to, for example, increase the compressor surge margin during the acceleration or deceleration engine condition.

In various embodiments, the gas turbine engine 10 may include a controller 62 configured to permit an operator to control operation of the modulation device 60. The controller 62 may be in communication (e.g., signal communication) with the modulation device 60. The controller 62 may include any type of computing device, computational circuit, or any type of process or processing circuit capable of executing a series of instructions that are stored in memory. The controller 62 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the modulation device 60, and the stored instructions are not limited to any particular form (e.g., program files, system data, buffers, drivers, utilities, system programs, etc.) provided they can be executed by the controller 62. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 62 may be achieved via the use of hardware, software, firmware, or any combination thereof. The controller 62 may also include input (e.g., a keyboard, a touch screen, etc.) and output devices (a monitor, sensor readouts, data ports, etc.) that enable the operator to input instructions, receive data, etc.

As shown in FIG. 4, in various embodiments, the gas turbine engine 10 may include a main generator 64 configured to supply electrical energy for electrical loads 66 of the aircraft 1000. Electrical loads 66 may include, but are not limited to, electronics, climate control systems, electric motors, lighting systems, gas turbine engine 10 support systems, weapon and/or detection systems (e.g., radar), etc. The main generator 64 may be operably connected to the second shaft 44 by, for example, an accessory-drive gearbox (not shown). The gas turbine engine 10 may further include an auxiliary generator 68 operably connected to the auxiliary turbine 52. The auxiliary generator 68 may be configured to generate electrical energy in response to application of the pressurized air 54, 54E to the auxiliary turbine 52. Accordingly, the electrical energy generated by the auxiliary generator 68 may supplement the electrical energy generated by the main generator 64. As a result, the auxiliary generator 68 may provide a reduction in the electrical loading on the main generator 64 providing a corresponding reduction in loading on the high-pressure turbine 48.

In various embodiments, the aircraft 1000 may include an energy storage device 70 in electrical communication with one or more of the main generator 64, the auxiliary generator 68, and the electrical loads 66. In various embodiments, the energy storage device 70 may be configured to store the electrical energy output of the auxiliary generator 68. The energy storage device 70 may be any suitable energy storage device suitable for storage of electrical energy such as, but not limited to, a battery, a capacitor, etc. In various other embodiments, the energy storage device 70 may be configured to store the mechanical output of the auxiliary turbine 52. For example, the energy storage device 70 may be a flywheel or other suitable device for storing mechanical energy.

In various embodiments, the auxiliary generator 68 may have a motor/generator configuration such that an electrical energy transfer to the auxiliary generator 68 (e.g., by the energy storage device 70) may cause the auxiliary generator 68 to apply a rotational force to the high-pressure spool 26, for example, via the auxiliary turbine 52, a gearbox system shared by the auxiliary turbine 52 and the auxiliary generator 68 (see, e.g., the gearbox system 58 of FIG. 5), or any other suitable form of mechanical connection. The auxiliary generator 68 may provide some or all of the rotational force that is necessary for operation of the high-pressure spool 26. Thus, in various embodiments, the high-pressure turbine 48 may be mechanically disconnected from the second shaft 44 such that only the auxiliary generator 68 applies a rotational force to the high-pressure spool 26.

The auxiliary turbine 52, auxiliary generator 68, and energy storage device 70 may store the energy extracted from the pressurized air 54 during engine conditions when application of the rotational force of the auxiliary turbine 52 to the second shaft 44 by the auxiliary turbine 52 may not be necessary to improve gas turbine engine 10 efficiency. Alternatively, during engine conditions when application of the rotational force of the auxiliary turbine 52 to the second shaft 44 would improve gas turbine engine 10 efficiency, the electrical energy stored in the energy storage device 70 may be used by the auxiliary generator 68 and the auxiliary turbine 52 to apply the rotational force to the second shaft 44. For example, in an idle engine condition where the relevant idle limitation is a minimum fuel flow limit, there may be no beneficial use of the energy recovered from the pressurized air 54. As used herein, the term "minimum fuel flow limit" may include engine operating conditions wherein fuel flow is above the minimum fuel flow limit but wherein fuel flow cannot be further reduced as a result of one or more other engine operational limits, such as, but not limited to minimum speed, minimum fuel-air ratio, etc. Accordingly, the mechanical energy of the pressurized air 54 may be recovered and stored, as described above, until it can be beneficially used, for example, during an acceleration engine condition of the gas turbine engine 10.

In various embodiments, the aircraft 1000 may include more than one gas turbine engine 10 according to the embodiments of the present disclosure (see, e.g., FIG. 1), for example, a first gas turbine engine 10 and a second gas turbine engine 10 which may be substantially identical to one another. The first gas turbine engine 10 may include first main and/or auxiliary generators 64, 68 and the second gas turbine engine 10 may include second main and/or auxiliary generators 64, 68. The first generators 64, 68 and the second generators 64, 68 may be electrically cross-connected. Accordingly, an electrical energy generated by one or both of the first generators 64, 68 may be used by the auxiliary generator 68 and the auxiliary turbine 52 of the second gas turbine engine 10 to apply a rotational force to the second shaft 44 of the second gas turbine engine 10, for example, to balance loading between the first and second gas turbine engines 10.

As shown in FIG. 5, in various embodiments, the auxiliary turbine 52 and the auxiliary generator 68 may be in operable communication with one another via the gearbox system 58. The gearbox system 58 may additionally include a gearbox shaft 72 operably connected to the second shaft 44 and configured to apply a rotational force to the second shaft 44. As discussed above, the auxiliary generator 68 may have a motor/generator configuration. Accordingly, one or both of the auxiliary turbine 52 and the auxiliary generator 68 (e.g., acting as a motor using electrical energy from, for example the energy storage device 70) may be configured to apply a rotational force to the gearbox system 58 which may apply the rotational force to the second shaft 44. Further, the auxiliary turbine 52 may be configured to apply a rotational force to the auxiliary generator 68 via the gearbox system 58 for the generation of electrical energy. As a result, rotational energy produce by the auxiliary turbine 52 as result of the pressurized air 54, 54E may be split such that a first portion of the rotational energy provided by the auxiliary turbine 52 to the gearbox system 58 may be applied to the auxiliary generator 68 for electrical generation while a second portion of the rotational energy provided by the auxiliary turbine 52 to the gearbox system 58 may be applied to the second shaft 44. In various embodiments, the high-pressure turbine 48 may be mechanically disconnected from the second shaft 44 such that only the gearbox system 58 applies a rotational force to the second shaft 44. In various embodiments, gas turbine engine 10 may not include an auxiliary generator 68 and the main generator 64 may be in operable communication with the gearbox system 58 to perform the functions of the auxiliary generator 68, described above.

The ratio of the first portion of the rotational energy provided by the auxiliary turbine 52 to the gearbox system 58 for operation of the auxiliary generator 68 and the second portion of the rotational energy provided by the auxiliary turbine 52 to the gearbox system 58 for operation of the second shaft 44 may be determined by one or more of, for example, an achievable reduction in idle fuel flow, a stall margin requirement, an acceleration time requirement, etc. For example, when a further reduction in fuel flow is not possible, additional rotational energy from the auxiliary turbine 52 may be applied to the auxiliary generator 68 to generate additional electrical energy for storage in the energy storage device 70.

Figure 6:
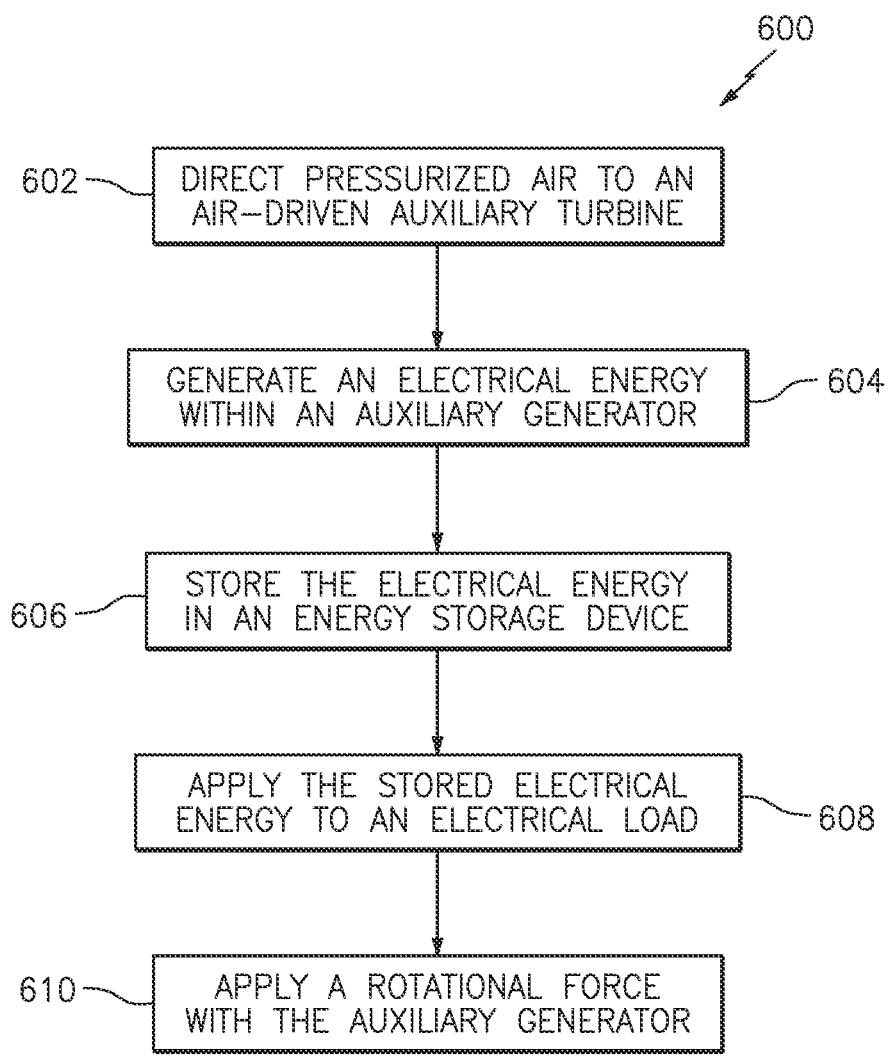
FIG. 6 is a flowchart depicting a method for operating a gas turbine engine in accordance with one or more embodiments of the present disclosure.

Referring to FIGS. 4-6, a method 600 for operating a gas turbine engine, such as the gas turbine engine 10, is disclosed. In Step 602, the pressurized air 54 is directed to the auxiliary turbine 52, for example, from the high-pressure compressor 46. In Step 604, the auxiliary generator 68, in operable communication with the auxiliary turbine 52, generates an electrical energy in response to application of the pressurized air 54 to the auxiliary turbine 52. In Step 606, the electrical energy is stored in the energy storage device 70. In Step 608, the electrical energy stored in the energy storage device 70 is applied to the auxiliary generator 68 having a motor/generator configuration. In step 610, the auxiliary generator 68 applies a rotational force to the second shaft 44 of the high-pressure spool 26. For example, the auxiliary generator 68 may apply the rotational force indirectly to the second shaft 44 via the auxiliary turbine 52 or the gearbox system 58.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A method for operating a gas turbine engine, the method comprising:

directing pressurized air to an air-driven first auxiliary turbine of a first gas turbine engine during a first engine loading condition of the first gas turbine engine and controlling a flow rate of the pressurized air directed to the first auxiliary turbine;

generating electrical energy, during the first engine loading condition, with a first auxiliary generator of the first gas turbine engine in operable communication with the first auxiliary turbine, wherein the first gas turbine engine is electrically cross-connected with a second gas turbine engine comprising a second auxiliary generator in operable communication with a second auxiliary turbine;

storing the electrical energy in an energy storage device during the first engine loading condition; and applying the electrical energy stored in the energy storage device to an electrical load at a second engine loading condition of the first gas turbine engine which is greater than the first engine loading condition, wherein applying the electrical energy stored in the energy storage device to the electrical load includes applying the electrical energy to the second auxiliary generator causing the second auxiliary generator to apply a rotational force to a second rotatable shaft of the second gas turbine engine, via the second auxiliary turbine, to balance loading between the first gas turbine engine and the second gas turbine engine, the second auxiliary turbine in rotational communication with the second rotatable shaft which is operably connected between a second compressor and a second turbine of the second gas turbine engine;

wherein the first auxiliary turbine is in rotational communication with a first rotatable shaft operably connected between a first compressor and a first turbine of the first gas turbine engine.

2. The method of claim 1, wherein applying the electrical energy stored in the energy storage device to the electrical load includes applying the electrical energy to the first auxiliary generator causing the first auxiliary generator to apply a rotational force to the first rotatable shaft.

3. The method of claim 2, further comprising selectively engaging an auxiliary shaft of the first auxiliary turbine to the first rotatable shaft with a clutch.

4. The method of claim 1, wherein controlling the flow rate of the pressurized air directed to the first auxiliary turbine includes establishing, with a modulation device, a first flow rate of the pressurized air at the first engine loading condition and a second flow rate of the pressurized air, different than the first flow rate of the pressurized air, at the second engine loading condition.

5. The method of claim 4, wherein the first flow rate is greater than the second flow rate.

6. The method of claim 1, wherein the energy storage device is a battery.

7. The method of claim 1, wherein the first engine loading condition is defined by a minimum fuel flow limit.

8. The method of claim 1, wherein, in the first engine loading condition, the first auxiliary turbine applies a first rotational force to the first auxiliary generator for generation of the electrical energy and a second rotational force to the first rotatable shaft.

9. A method for operating a gas turbine engine, the method comprising:

directing pressurized air to an air-driven first auxiliary turbine of a first gas turbine engine and controlling a flow rate of the pressurized air directed to the first auxiliary turbine;

generating electrical energy with a first auxiliary generator of the first gas turbine engine in operable communication with the first auxiliary turbine;

wherein the first gas turbine engine is electrically cross-connected with a second gas turbine engine comprising a second auxiliary generator in operable communication with a second auxiliary turbine, the method further comprising:

applying the electrical energy generated by the first auxiliary generator to the second auxiliary generator causing the second auxiliary generator to apply a rotational force to a second rotatable shaft of the second gas turbine engine, via the second auxiliary turbine, to balance loading between the first gas turbine engine and the second gas turbine engine, the second auxiliary turbine in rotational communication with the second rotatable shaft which is operably connected between a second compressor and a second turbine of the second gas turbine engine;

wherein the first auxiliary turbine is in rotational communication with a first rotatable shaft operably connected between a first compressor and a first turbine of the first gas turbine engine.

\* \* \* \* \*